United States Patent
Bandera

[11] Patent Number: 5,932,831
[45] Date of Patent: Aug. 3, 1999

[54] DEVICE FOR FEEDING AMMUNITION INTO AN AIRBORNEE WEAPON AND AIRCRAFT EQUIPPED WITH SUCH A DEVICE

[75] Inventor: Gianluigi Bandera, Gallarate, Italy

[73] Assignee: Finmeccanica S.p.A., Rome, Italy

[21] Appl. No.: 08/904,395

[22] Filed: Jul. 31, 1997

[30] Foreign Application Priority Data

Aug. 2, 1996 [IT] Italy .................................. T096A0670

[51] Int. Cl.$^6$ ........................................... F41A 9/34
[52] U.S. Cl. ........................... 89/33.14; 89/37.16; 89/34
[58] Field of Search ................ 89/33.14, 33.16, 89/33.2, 33.25, 37.21, 37.22, 37.19, 37.18, 37.16, 37.17, 34; 193/25 AC

[56] References Cited

U.S. PATENT DOCUMENTS

| | | | |
|---|---|---|---|
| 2,386,894 | 10/1945 | Hartley | 89/33.16 |
| 2,398,263 | 4/1946 | Trimbach | 89/34 |
| 2,479,633 | 8/1949 | MacKenzie | 89/33.14 |
| 2,550,837 | 5/1951 | MacKenzie | 89/33.14 |
| 2,756,638 | 7/1956 | Maillard | 89/33.16 |
| 3,352,207 | 11/1967 | Proudlove | 89/37.19 |
| 3,911,787 | 10/1975 | Seibel | 89/34 |
| 4,424,735 | 1/1984 | Bacon et al. | 89/34 |
| 4,951,548 | 8/1990 | Wixon et al. | 89/33.14 |

FOREIGN PATENT DOCUMENTS

| | | | |
|---|---|---|---|
| 639060 | 11/1936 | Germany | 89/37.16 |
| 531695 | 1/1941 | United Kingdom | 89/34 |
| 0703049 | 1/1954 | United Kingdom . | |
| 1186992 | 4/1970 | United Kingdom . | |
| 2149069 | 6/1985 | United Kingdom | 89/37.16 |

Primary Examiner—Stephen M. Johnson
Attorney, Agent, or Firm—Kane,Dalsimer,Sullivan, Kurucz,Levy,Eisele and Richard, LLP

[57] ABSTRACT

A device for feeding ammunition in the form of a continuous belt into a weapon carried on an aircraft; the device having a rigid conduit extending longitudinally along a side of the fuselage of the aircraft, and in turn having a rear portion for loading the ammunition, and a front portion connectable to the weapon by a flexible conduit; the rear portion of the rigid conduit being of such a width as to house the ammunition in two rows, in an accordion configuration; and the front portion being narrower to house the ammunition in a single row.

9 Claims, 2 Drawing Sheets

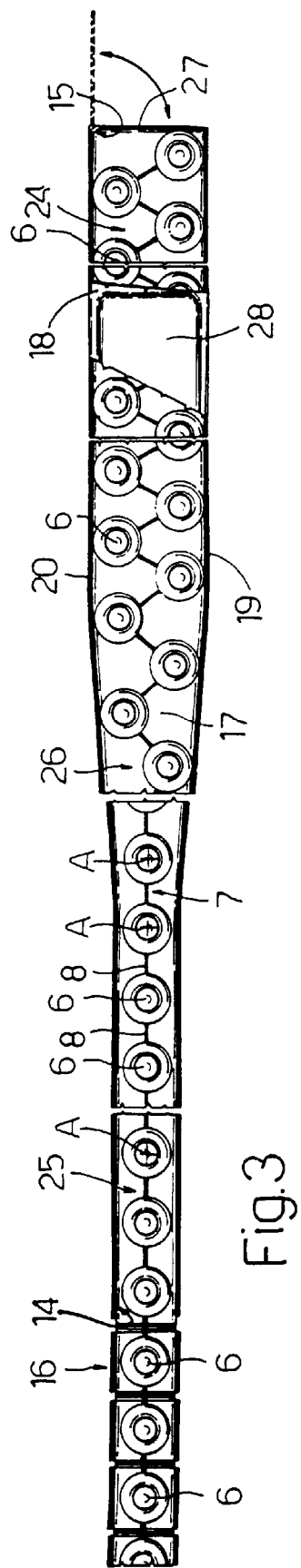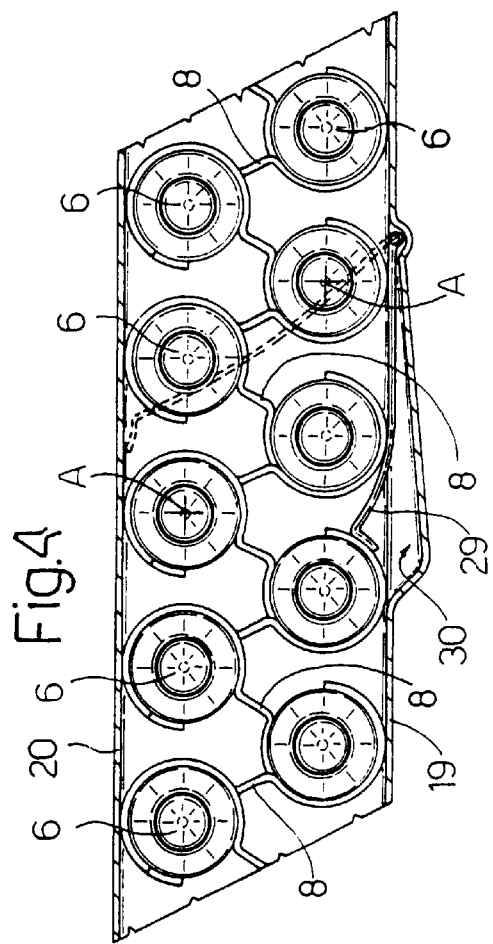

DEVICE FOR FEEDING AMMUNITION INTO AN AIRBORNEE WEAPON AND AIRCRAFT EQUIPPED WITH SUCH A DEVICE

BACKGROUND OF THE INVENTION

The present invention relates to a device for feeding ammunition into an airborne weapon, e.g. a helicopter gun.

Ammunition feed devices are known, which substantially comprise an ammunition box, and a rigid conduit connected at one end to the box and at the other end to the feed opening of the gun inside which the ammunition slides. The ammunition comprises a number of shots connected in articulated manner by metal links which, together with the shots, form a continuous flexible belt.

If the gun is mounted on a revolving turret, a flexible conduit is inserted between the rigid conduit and the feed opening to permit rotation and elevation of the gun.

Finally, if the ammunition box is located some distance from the gun, e.g. for reasons of space or to prevent a noticeable alteration in the center of gravity of the aircraft as the box is emptied, the increase in the length of the conduit increases the friction that must be overcome to feed the ammunition from the box into the gun. Which friction, in addition to the effort required to remove the ammunition from the box and feed it into the conduit, often requires the use of a booster feed motor between the box and the conduit.

Devices of the above type are not without defects, foremost of which is the ammunition jamming inside the device, so that the gun is put out of action and the aircraft left undefended precisely at the most critical phase in the mission, i.e. on engaging the enemy.

In known devices of the above type, jamming of the ammunition mainly occurs between the box and the rigid conduit, the likelihood of which increases even further using a booster motor.

SUMMARY OF THE INVENTION

It is an object of the present invention to provide an ammunition feed device designed to overcome the aforementioned drawbacks typically associated with known devices.

According to the present invention, there is provided a device for feeding ammunition into a weapon carried on an aircraft; said ammunition being connected in articulated manner by links to form a continuous belt; and the device comprising at least a first conduit along which the ammunition is drawn towards said weapon; characterized in that said first conduit comprises a first portion of a section sufficient to house said ammunition in two rows with said links arranged in an accordion configuration; and a second portion of such a section as to house said ammunition in a single row; said first portion comprising at least one opening for loading said ammunition; and said second portion being connectable to said weapon.

BRIEF DESCRIPTION OF THE DRAWINGS

A preferred, non-limiting embodiment of the present invention will be described by way of example with reference to the accompanying drawings, in which:

FIG. 3 shows a schematic axial section of the device according to the invention, complete with ammunition;

FIG. 4 shows a larger-scale axial section of a detail of a variation of the FIG. 3 device.

DETAILED DESCRIPTION OF THE INVENTION

Figure 1:
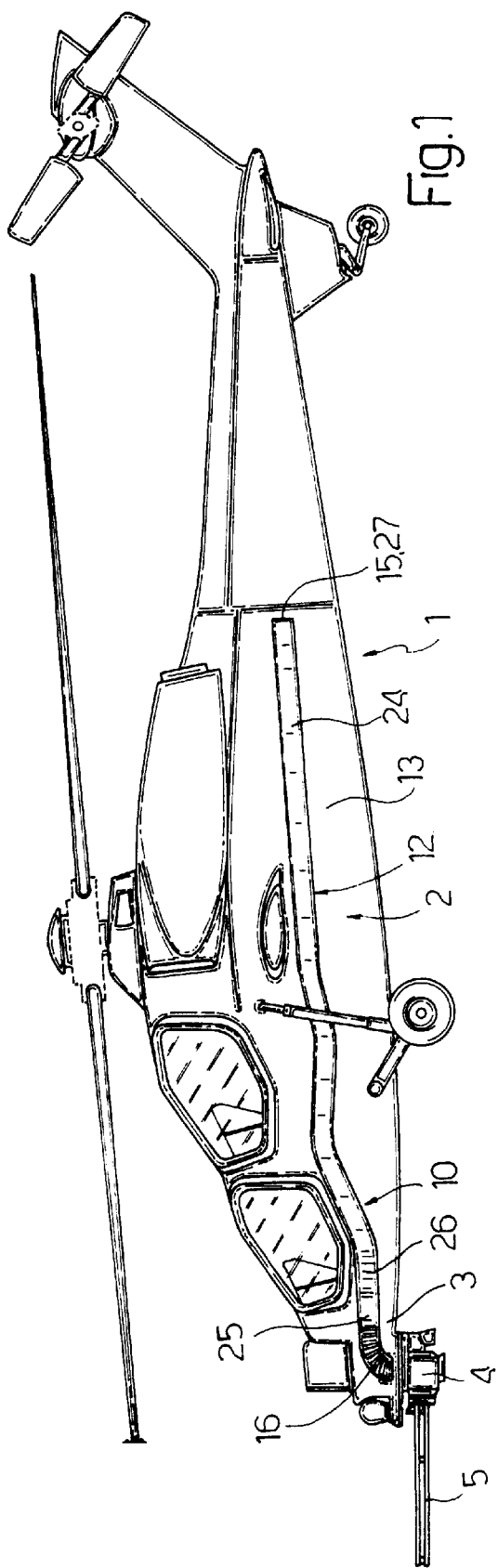
FIG. 1 shows a side view of a helicopter featuring an ammunition feed device in accordance with the present invention.
Figure 2:
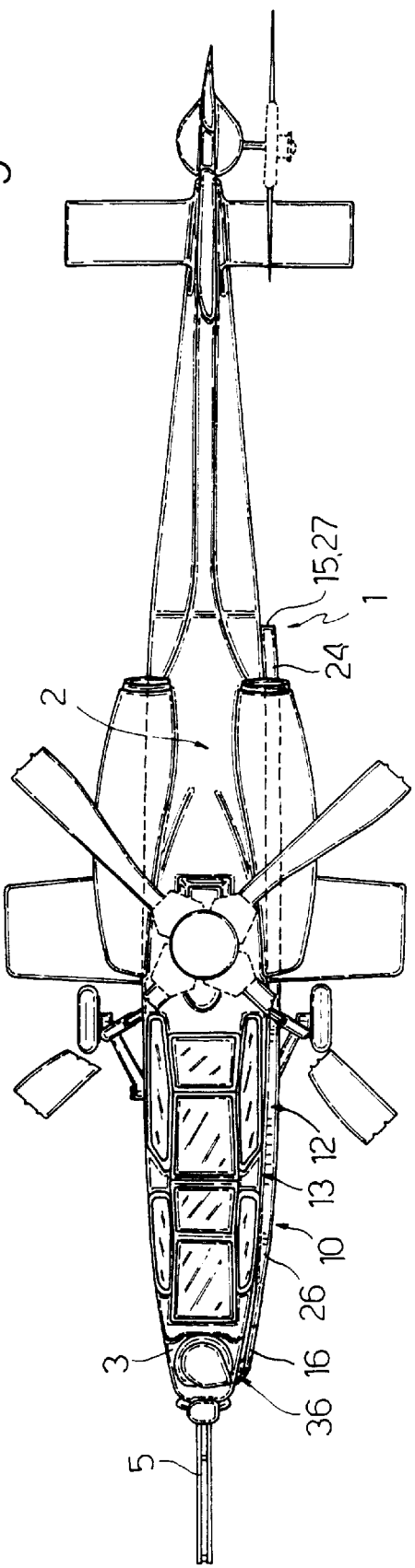
FIG. 2 shows a plan view of the FIG. 1 helicopter.

Number 1 in FIGS. 1 and 2 indicates a helicopter comprising a fuselage 2 with a nose 3; and a revolving turret 4 beneath nose 3.

Turret 4 is equipped with a gun 5 having a system (not shown) for automatically loading ammunition 6 supplied in the form of a continuous belt 7 (FIG. 3). The pieces of ammunition 6 comprise respective axes A parallel to one another, and are connected by known metal links 8 shaped so as to receive the ammunition in removable and rotary manner, and connected to one another in articulated manner about axes A of the ammunition.

Helicopter 1 comprises a device 10 for feeding ammunition 6 into gun 5.

According to the present invention, device 10 comprises a shaped rigid conduit 12 extending externally along the side 13 of fuselage 2.

Conduit 12 (FIG. 3) comprises a rear loading opening 15, and a front opening 14 close to nose 3 and connected to the feed opening (not shown) of gun 5 by a known flexible conduit 16.

Conduit 12 has a rectangular section, and is defined by a bottom wall 17, a top wall 18, and two lateral walls 19, 20.

More specifically, conduit 12 comprises a wider rear portion 24, adjacent to opening 15, for housing ammunition 6 vertically in two rows with links 8 in a so-called "accordion" or "zigzag" configuration, as shown schematically in FIG. 3; and a narrower front portion 25 of such a width as to feed the ammunition vertically in a single row. Portions 24 and 25 of conduit 12 are connected to each other by an intermediate transition portion 26 decreasing gradually in section (width) from portion 24 towards portions 25; and rear portion 24 extends along large part of the length of conduit 12.

Rear opening 15 of conduit 12 is closed by a hatch 27; and top wall 18 of conduit 12 comprises a number of hatches 28 (only one shown in FIG. 3) allowing access to intermediate portions of the ammunition during loading, to ensure it is arranged properly.

Bottom wall 17 of conduit 12 conveniently comprises a lining (not shown) of conducting material with a low friction coefficient, e.g. a plate of stainless steel, for ensuring smooth slide of the ammunition and for dispersing electrostatic charges.

Flexible conduit 16 curves inwards of the helicopter and into nose 3 through a lateral opening 36 in the nose, and is twisted to feed ammunition 6 to gun 5 in the pointing direction of turret 4.

Device 10 operates as follows.

Ammunition 6 is normally supplied in standard boxes (not shown) containing a continuous belt comprising a predetermined number, e.g. a hundred, pieces of ammunition.

As device 10 can accommodate more, e.g. over three hundred, pieces of ammunition, a number of belts are loaded successively into conduit 12 through rear opening 15.

The first belt is slid longitudinally along rigid conduit 12 and flexible conduit 16 until one end of the belt reaches the automatic loading system of gun 5; and the ammunition 6 in transition portion 26 and rear portion 24 is "packed" manually into said "accordion" or "zigzag" configuration of links 8, so that, where conduit 12 is wide enough, ammunition 6 is arranged in two rows, each adjacent to a respective lateral wall 19, 20.

The other belts of ammunition 6 are inserted one after the other and slid forward until one end clicks in known manner onto the end of the previous belt to form a single continuous belt 7 of ammunition.

As soon as it is inserted, each belt is "packed" to arrange ammunition 6 in two rows along rear portion 24 of conduit 12.

Top hatches 28 allow access to intermediate portions of conduit 12 to enable the ammunition to be slid easily and packed along the conduit by hand.

In actual use, the ammunition is supplied as follows.

When gun 5 is activated, the single-row ammunition (to begin with, only the ammunition in flexible conduit 16 and rigid conduit 12 downstream from transition portion 26) is drawn forward.

The double-row ammunition 6 then "unravels" gradually into a single row, commencing with the ammunition immediately upstream from transition portion 26 and working gradually towards the rear end of conduit 12. That is, the double-row ammunition furthest away from gun 5 remains in position until, as the downstream ammunition is gradually used up, it, too, unravels into a single row.

That is, as opposed to unraveling at transition portion 26 (which only occurs when conduit 12 is fully loaded), the ammunition unravels from a double into a single row progressively along rear portion 24 of conduit 12.

As such, once the double row is fully unraveled into a single row, the whole length of conduit 12 contains only single-row ammunition, so that the number of pieces of ammunition actually drawn by gun 5 at most corresponds to a belt of single-row ammunition of the same length as conduit 12. Conversely, until the double row if fully unraveled, the number of pieces of ammunition actually drawn by the gun is even smaller.

Feeding the ammunition linearly by actually drawing only a small number of pieces provides for dispensing with an auxiliary booster motor.

In the FIG. 4 variation, conduit 12 is provided inside with, e.g. three, movable partitions 29 (only one shown) hinged to a lateral wall 19 of conduit 12, and which face in the traveling direction of the ammunition, and are loaded by respective springs (not shown) against the other lateral wall 20.

By rotating so as to substantially withdraw inside respective seats 30 formed in wall 19, partitions 29 in no way hinder the passage of ammunition 6 along conduit 12, but prevent the ammunition from sliding back towards rear opening 15.

The advantages of device 10 according to the present invention will be clear from the foregoing description.

In particular, it provides for dispensing with the conventional ammunition box (and the booster motor possibly associated with the box), thus eliminating the most critical stage in supply of the ammunition to gun 5, i.e. transfer of the ammunition from the box to the feed conduit, and so drastically reducing the likelihood of the ammunition jamming.

Eliminating the ammunition box, and possibly also the booster motor, provides for greatly simplifying the device, and a considerable reduction in weight and cost.

Housing the ammunition in conduit 12 as opposed to a box provides for spreading the weight of ammunition 6 (normally concentrated in the box) along the longitudinal axis of the aircraft, thus reducing the shift in the center of gravity as the ammunition is used up.

Using a small-section conduit requires no specially assigned space within the fuselage, and, if the conduit is external, as in the example described, the drag caused by the leading area of the conduit is very small.

Finally, conventional ammunition boxes are normally designed for a specific type of aircraft, which means procuring and consigning a given number of specially designed boxes to the rearming location, which may be some distance from a fully equipped supply and transport base; and rearming consists in replacing the empty or commenced box with a full box of ammunition.

The present invention, on the other hand, requires no special equipment, and employs standard ammunition which may be used on any type of aircraft, and which is removed from standard boxes containing hundred-shot belts, and is loaded easily and quickly into conduit 12. Yet a further advantage is that, in the event only part of the ammunition is fired in the course of the mission, only the used ammunition, as opposed to the whole box, need be replenished.

Clearly, changes may be made to the device as described and illustrated herein without, however, departing from the scope of the present invention.

I claim:

1. A device (10) for feeding ammunition (6) into a weapon (5) carried on an aircraft (1); said ammunition (6) including a plurality of ammunition pieces being connected in articulated manner by links (8) to form a continuous belt (7); and the device (10) comprising first conduit means extending externally along a side (13) of said aircraft, said first conduit (12) comprising:

a first portion (24) of a section sufficient to house said ammunition (6) in two rows with said links (8) arranged in an accordion configuration; and a second portion (25) connectable to said weapon and having such a section as to house said ammunition (6) in a single row;

said first portion (24) comprising at least one opening (15) for loading said ammunition (6) into said first conduit means so that said continuous belt of ammunition pieces is wholly accommodated within said first conduit means.

2. A device as claimed in claim 1, wherein said first conduit means (12) comprises an intermediate transition portion (26) decreasing in section from said first portion (24) towards said second portion (25).

3. A device as claimed in claim 1, wherein said first conduit means (12) is rigid.

4. A device as claimed in claim 1, further comprising a flexible second conduit means (16) connected to said second portion (25) of said first conduit means (12) and connectable to said weapon (5).

5. A device as claimed in claim 1, wherein said first conduit means (12) has a rectangular section.

6. A device as claimed in claim 5, wherein said first conduit means (12) comprises a top wall (18) having a number of hatches (28).

7. An aircraft comprising an on-board weapon (5) and a device (10) for feeding ammunition (6) to said weapon (5);

said ammunition (6) including a plurality of ammunition pieces being connected in articulated manner by links (8) to form a continuous belt (7);

the device (10) comprising conduit means (12) extending externally along a side (13) of the aircraft (1), said conduit means comprising;

a first portion (24) of a section sufficient to house said ammunition (6) in two rows with said links (8) arranged in an accordion configuration; and a second portion (25) connectable to said weapon and having such a section as to house said ammunition (6) in a single row;

said first portion (24) comprising at least one opening (15) for loading said ammunition (6) into said conduit means so that said continuous belt of ammunition pieces is wholly accommodated within said conduit means.

8. An aircraft as claimed in claim 7, wherein said first conduit means (12) comprises an intermediate transition portion (26) decreasing in section from said first portion (24) towards said second portion (25).

9. An aircraft as claimed in claim 7, wherein conduit means (12) is rigid.

* * * * *

UNITED STATES PATENT AND TRADEMARK OFFICE
CERTIFICATE OF CORRECTION

PATENT NO. : 5,932,831
DATED : August 3, 1999
INVENTOR(S) : Gianluigi Bandera

It is certified that error appears in the above-identified patent and that said Letters Patent is hereby corrected as shown below: Title page:and Column 1, line 2,
"AIRBORNEE" should be changed to --AIRBORNE--.

Signed and Sealed this
First Day of February, 2000

Attest:

Q. TODD DICKINSON

Attesting Officer

Acting Commissioner of Patents and Trademarks